United States Patent
Sonoda et al.

(10) Patent No.: US 10,748,026 B2
(45) Date of Patent: Aug. 18, 2020

(54) LINE SEGMENT DETECTION METHOD

(71) Applicant: IHI Corporation, Koto-ku (JP)

(72) Inventors: Shinichirou Sonoda, Tokyo (JP); Hajime Banno, Tokyo (JP); Kentaro Mizouchi, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/846,502

(22) Filed: Dec. 19, 2017

(65) Prior Publication Data

US 2018/0121749 A1     May 3, 2018

Related U.S. Application Data

(63) Continuation of application No. PCT/JP2016/068976, filed on Jun. 27, 2016.

(30) Foreign Application Priority Data

Oct. 9, 2015   (JP) ................. 2015-201252

(51) Int. Cl.
    *G06K 9/46*     (2006.01)
    *G06T 7/73*     (2017.01)
    (Continued)

(52) U.S. Cl.
    CPC .............. *G06K 9/4604* (2013.01); *G06T 7/13* (2017.01); *G06T 7/194* (2017.01); *G06T 7/70* (2017.01);
    (Continued)

(58) Field of Classification Search
    CPC .. G06K 9/00624; G06K 9/00805; G06K 9/50; G06K 2009/4666; G06K 9/00771;
    (Continued)

(56) References Cited

U.S. PATENT DOCUMENTS 6,453,069 B1 * 9/2002 Matsugu .................. G06K 9/48
                                                                      382/173
6,731,799 B1 * 5/2004 Sun ..................... G06K 9/00369
                                                                      348/142

(Continued)

FOREIGN PATENT DOCUMENTS

JP     7-129767     5/1995
JP     2003-132357     5/2003
(Continued)

OTHER PUBLICATIONS

Extended European Search Report dated Jan. 24, 2019 in Patent Application No. 16853303.2, 8 pages.
(Continued)

*Primary Examiner* — Aklilu K Woldemariam
(74) *Attorney, Agent, or Firm* — Oblon, McClelland, Maier & Neustadt, L.L.P.

(57) ABSTRACT

A line segment detection method includes acquiring an image, extracting from the image a straight line that includes a line segment, acquiring a luminance distribution of the straight line, generating a virtual function model that contains a distribution of a foreground and a background of the image by using the luminance distribution, and determining whether luminance values near end points (start point and end point) of the line segment contained in the virtual function model probabilistically belong to the foreground or the background, and estimating end points (start point and end point) in the virtual function model.

4 Claims, 4 Drawing Sheets

(51) Int. Cl.
  *G06T 7/13*    (2017.01)
  *G06T 7/194*   (2017.01)
  *G06T 7/70*    (2017.01)

(52) U.S. Cl.
  CPC ...... *G06T 7/75* (2017.01); *G06T 2207/10032* (2013.01); *G06T 2207/20061* (2013.01); *G06T 2207/30241* (2013.01)

(58) Field of Classification Search
  CPC .............. G06K 9/52; G06K 9/3233; G06K 2009/00322; G06K 9/4676; G06K 2009/6213; G06K 9/4671; G06K 9/00791; G06K 9/46; G06K 9/6255; G06K 2209/23; G06K 9/4604; G06K 9/6274; A61B 8/5246; G06T 7/73; G06T 7/11; G06T 7/187; G06T 7/62; G06T 7/10; G06T 7/12; G06T 7/194; G06T 7/75; G06T 2207/20112; G06T 7/246; G06T 7/248; G06T 7/33; G06T 7/70; B01L 7/525; H04N 7/181; H04N 7/183
  USPC ........ 348/142, 145, 148; 382/103, 113, 173, 382/276
  See application file for complete search history.

(56) References Cited

U.S. PATENT DOCUMENTS

| | | | | |
|---|---|---|---|---|
| 6,993,184 | B2* | 1/2006 | Matsugu | G06K 9/20 382/173 |
| 7,606,417 | B2* | 10/2009 | Steinberg | G06K 9/00248 382/173 |
| 7,680,342 | B2* | 3/2010 | Steinberg | G06K 9/0061 382/224 |
| 9,070,012 | B1 | 6/2015 | Sieracki et al. | |
| 9,171,217 | B2* | 10/2015 | Pawlicki | B60W 30/12 |
| 2005/0135658 | A1* | 6/2005 | Yamamoto | G06K 9/00798 382/104 |
| 2006/0110007 | A1 | 5/2006 | Yanagisawa et al. | |
| 2006/0207066 | A1* | 9/2006 | Segelke | G02B 21/10 23/295 R |
| 2008/0317454 | A1* | 12/2008 | Onuki | G02B 7/08 396/128 |
| 2010/0034476 | A1* | 2/2010 | Kido | G06K 9/6203 382/243 |
| 2010/0092079 | A1* | 4/2010 | Aller | G06K 9/3216 382/165 |
| 2010/0284569 | A1* | 11/2010 | Sakurai | G06T 3/00 382/103 |
| 2011/0206274 | A1* | 8/2011 | Tateno | G06T 7/75 382/154 |
| 2012/0041722 | A1* | 2/2012 | Quan | G06T 17/05 703/1 |
| 2012/0140982 | A1* | 6/2012 | Sukegawa | G06K 9/00221 382/103 |
| 2012/0250982 | A1* | 10/2012 | Ito | G06T 7/194 382/159 |
| 2014/0187942 | A1 | 7/2014 | Wang et al. | |
| 2014/0254872 | A1* | 9/2014 | Guan | G06K 9/00624 382/103 |
| 2015/0115107 | A1* | 4/2015 | Andoh | B64G 1/242 244/171.1 |
| 2015/0131871 | A1 | 5/2015 | Chen et al. | |
| 2015/0186733 | A1* | 7/2015 | Hayakawa | G06K 9/46 382/103 |
| 2015/0350608 | A1* | 12/2015 | Winter | G06K 9/00771 382/103 |
| 2018/0060669 | A1* | 3/2018 | Pham | G06T 7/13 |

FOREIGN PATENT DOCUMENTS

| | | |
|---|---|---|
| JP | 2005-339468 | 12/2005 |
| JP | 2014-85719 | 5/2014 |
| JP | 2014-85720 | 5/2014 |
| JP | 2014-197378 | 10/2014 |
| RU | 2 523 944 C2 | 7/2014 |

OTHER PUBLICATIONS

Payam S. Rahmdel, et al., "A Review of Hough Transform and Line Segment Detection Approaches" Proceedings of the 10$^{th}$ International Conference on Computer Vision Theory and Applications—VISAAPP, XP055538747, Jan. 1, 2015, pp. 411-418.

Combined Office Action and Search Report dated Jan. 25, 2019 in Russian Patent Application No. 2018104244/08, 16 pages (with English translation).

Krasnobaev, A.A. "Review of algorithms for detecting simple image elements and analyzing the possibility of their hardware implementation" The Russian Academy of Science, http://www.keldysh.ru/papers/2005/prep114/prep2005_114.html, 2005, 18 pages (with English abstract).

Novotvortsev, L.V. et al. "Improved Line Detection Algorithm for reconstruction of buildings by aerial photographs" Volga Scientific Journal, 2014, 7 pages (with English abstract).

International Search Report dated Sep. 6, 2016 in PCT/JP2016/068976, filed on Jun. 27, 2016 ( with English Translation).

Written Opinion dated Sep. 6, 2016 in PCT/JP2016/068976, filed on Jun. 27, 2016.

\* cited by examiner

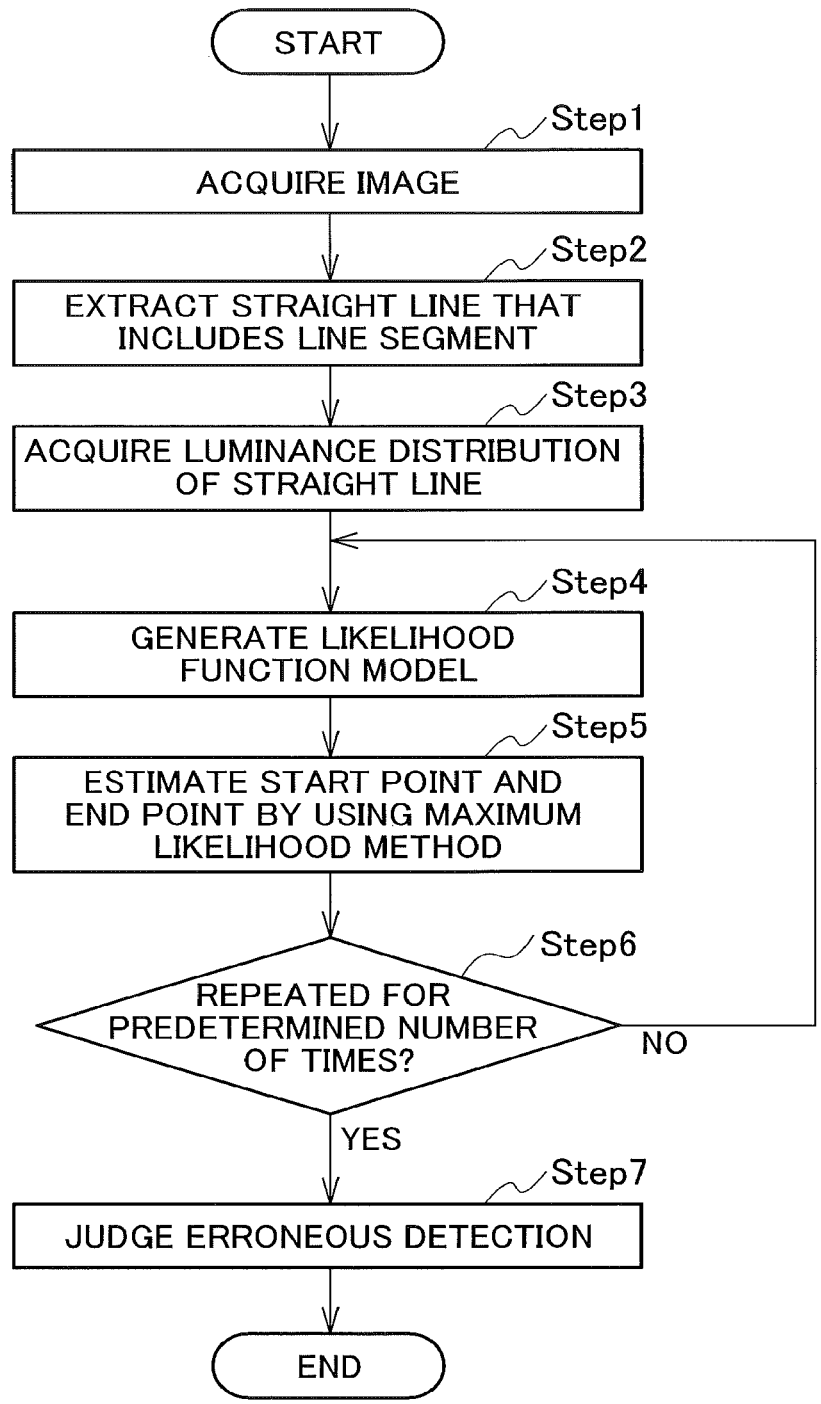

LINE SEGMENT DETECTION METHOD

CROSS REFERENCE TO RELATED APPLICATIONS

This application is a continuation application of International Application No. PCT/JP2016/068976, filed on Jun. 27, 2016, which claims priority to Japanese Patent Application No. 2015-201252, filed on Oct. 9, 2015, the entire contents of which are incorporated by reference herein.

BACKGROUND

1. Technical Field

The present disclosure relates to a line segment detection method, and particularly to a line segment detection method for accurately detecting a start point and an end point of a line segment in an image.

2. Description of the Related Art

At present, artificial satellites with various purposes such as military satellites, communication satellites, scientific satellites, observation satellites, and navigation satellites are orbiting around the Earth in orbits. If such an artificial satellite stops functioning or has lived out its life after serving the allocated purpose, the satellite often remains in its orbit and becomes debris (also called space debris). Moreover, remnants of a rocket and the like used to launch the artificial satellite and the like, too, remain in the orbit as debris.

At present, there are several thousands of orbiting debris. In addition, the debris has advanced to a stage of self-reproduction in which the number of the debris is increasing because of natural collision thereamong. Because it is possible that such debris may collide with an orbiting satellite that is currently in use or with a rocket used at the time of launching a satellite and the like, a highly accurate detection method is required.

For example, because low earth orbit debris has a high moving velocity, such debris appears as a linear trajectory in an image. To determine a position and an attitude of the debris, it is necessary to obtain with high accuracy linear end points (for example, a start point and an end point) of a line segment in the image. A method that uses the Hough transform technique is known in the art for detecting a linear object in an image (see Japanese Patent Application Laid-Open Publication No. 2014-197378 (Patent Literature 1)).

SUMMARY

However, in a method such as the one disclosed in Patent Literature 1 in which the Hough transform technique is used, only a straight line appearing in an image can be detected, but the linear end points (for example, a start point and an end point) cannot be detected.

The present disclosure has been made in view of the above circumstances. It is an object of the present disclosure to provide a line segment detection method that can efficiently and accurately detect end points of a line segment in an image.

According to an aspect of the present disclosure, a line segment detection method for detecting a line segment from an image, the line segment detection method includes extracting a straight line from the image that includes the line segment; acquiring a luminance distribution including acquiring a luminance distribution of the straight line; generating a virtual function model including generating a virtual function model that contains a distribution of a foreground and a background of the image by using the luminance distribution; and estimating end points including determining whether luminance values near end points of the line segment contained in the virtual function model probabilistically belong to the foreground or the background, and estimating the end points in the virtual function model.

The above line segment detection method may further include repeatedly regenerating the virtual function model by using the estimated values of the end points obtained at the estimating the end points.

The above line segment detection method may further include judging whether a detection is erroneous or not by using the estimated values of the end points obtained at the estimating the end points.

In the above line segment detection method, the virtual function model is any one of a likelihood function model, a ramp function model, and a sigmoid function model.

In the above line segment detection method, the estimating the end points may include estimating the end points by using a maximum likelihood method.

In the above line segment detection method, the image contains debris that moves in the Earth's orbit, and the line segment is a movement trajectory of the debris.

In a line segment detection method according to the present disclosure, by acquiring from an image that includes a line segment to be detected a luminance distribution of a straight line that includes the line segment, generating a virtual function model that contains a distribution of a foreground and a background, determining whether the luminance values near the end points in the virtual function model probabilistically belong to the foreground or the background and estimating the end points on the virtual function model, and correcting the end points, the end points (for example, start point and end point) of the line segment can be efficiently and accurately detected.

BRIEF DESCRIPTION OF THE DRAWINGS

FIG. 1 is a flowchart of a line segment detection method according to an embodiment of the present disclosure.

FIG. 2A illustrates a process of acquiring an image, and FIG. 2B illustrates a process of extracting a straight line.

FIG. 3A illustrates a process of acquiring a luminance distribution, FIG. 3B illustrates a process of generating a virtual function model, and FIG. 3C illustrates a process of estimating end points.

FIG. 4A illustrates a luminance distribution that includes only a background, and FIG. 4B illustrates a luminance distribution that includes two fixed stars.

DESCRIPTION OF THE EMBODIMENTS

Figure 2A:
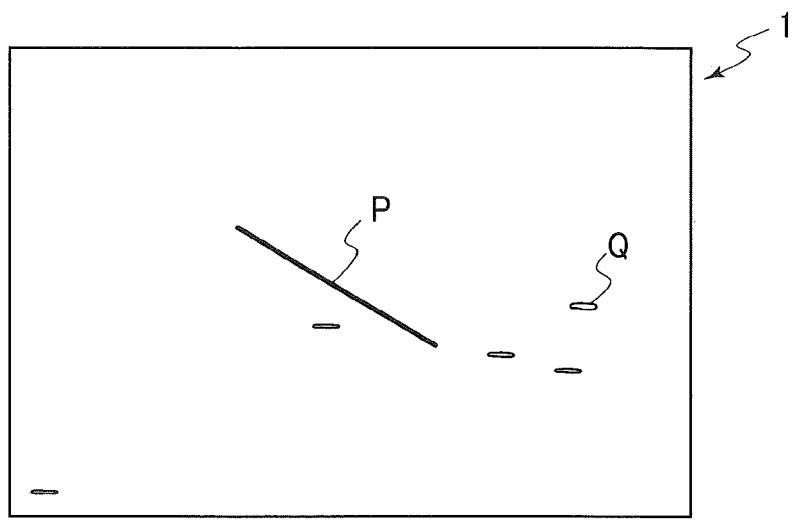
FIGS. 2A and 2B are diagrams for explaining the line segment detection method shown in FIG. 1, where
Figure 2B:
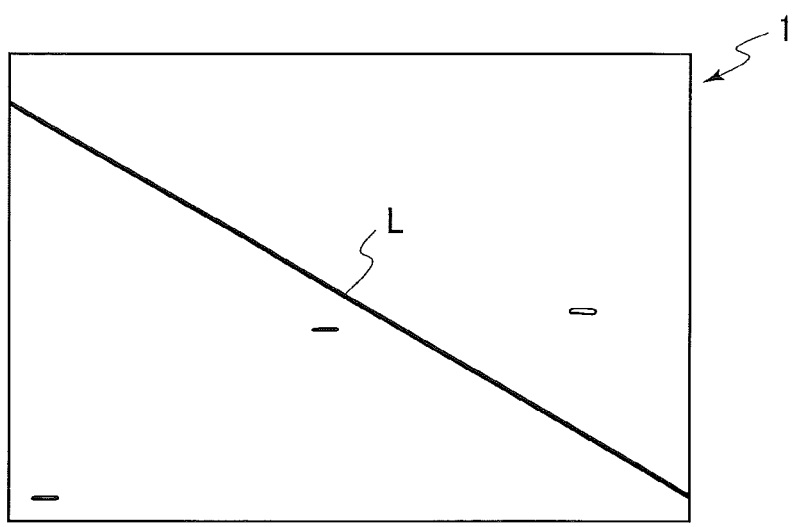
Figure 3A:
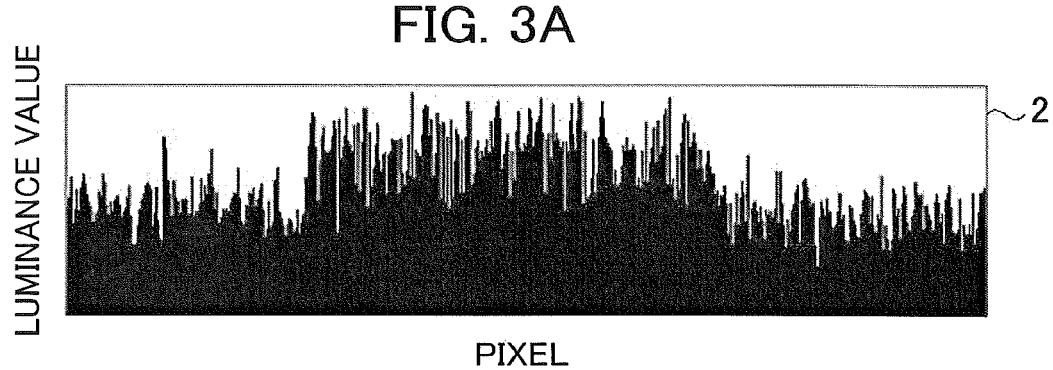
FIGS. 3A to 3C are diagrams for explaining the line segment detection method shown in FIG. 1, where
Figure 3B:
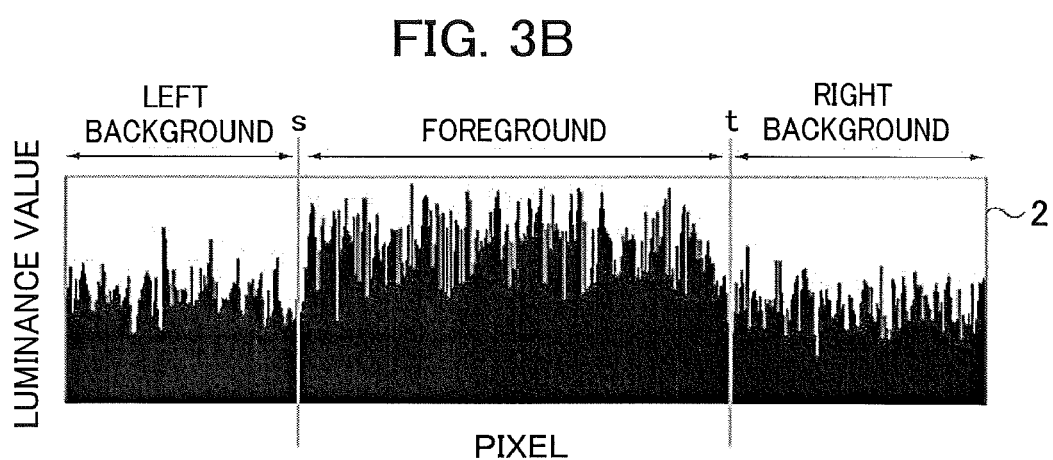
Figure 3C:
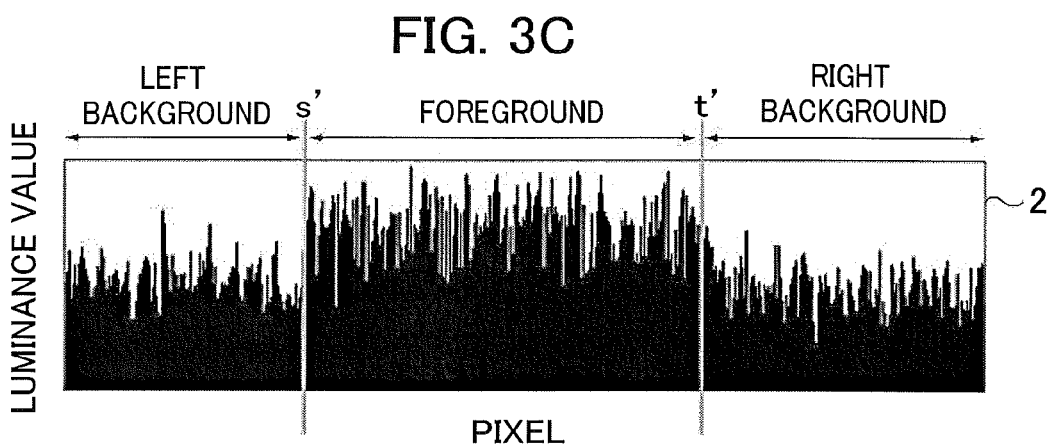
Figure 4A:
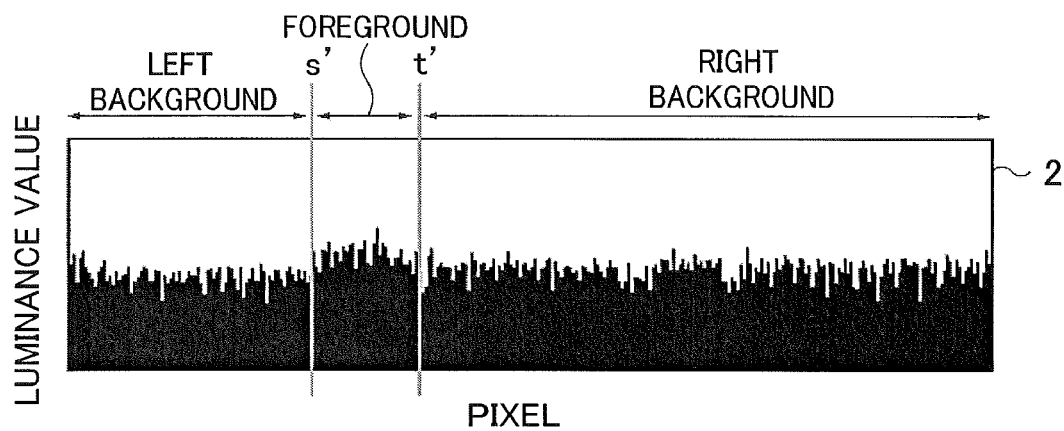
FIGS. 4A and 4B are diagrams for explaining a process of judging erroneous detection, where
Figure 4B:
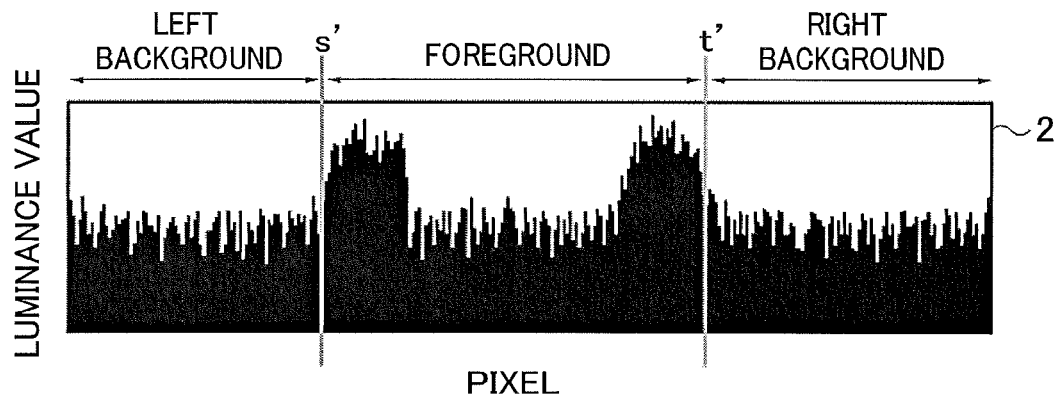

Exemplary embodiments of the present disclosure are explained below with reference to FIGS. 1 to 4B. FIG. 1 is a flowchart of a line segment detection method according to an embodiment of the present disclosure. FIGS. 2A and 2B are diagrams for explaining the line segment detection method shown in FIG. 1, where FIG. 2A illustrates a process of acquiring an image and FIG. 2B illustrates a process of extracting a straight line. FIGS. 3A to 3C are diagrams for explaining the line segment detection method shown in FIG. 1, where FIG. 3A illustrates a process of acquiring a luminance distribution, FIG. 3B illustrates a process of generating a virtual function model, and FIG. 3C illustrates a process of estimating endpoints. FIGS. 4A and 4B are diagrams for explaining a process of judging erroneous detection, where FIG. 4A illustrates a luminance distribution that includes only a background, and FIG. 4B illustrates a luminance distribution that includes two fixed stars.

As shown in FIGS. 1 to 4B, the present embodiment explains a line segment detection method for detecting a line segment P in an image 1. The method includes acquiring the image 1 (Step 1); extracting from the image 1 a straight line L that includes the line segment P (Step 2); acquiring a luminance distribution 2 of the straight line L (Step 3); generating a virtual function model Lm that contains a distribution of a foreground and a background of the image 1 by using the luminance distribution 2 (Step 4); estimating end points including determining whether luminance values near endpoints (start point s and end point t) of the line segment P contained in the virtual function model Lm probabilistically belong to the foreground or the background and estimating end points (start point s' and end point t') in the virtual function model Lm (Step 5); repeatedly regenerating the virtual function model Lm by using the estimated values of the start point s' and the end point t' obtained at the estimating the end points at Step 5 (Step 6); and judging whether the detection is erroneous or not by using the estimated values of the start point s' and the end point t' obtained at the estimating the end points at Step 5 (Step 7).

Acquiring an image (Step 1) includes inputting in an image processing unit of a computer and the like the image 1 that includes a movement trajectory of debris. The image 1 is acquired, for example, by using an imaging device in which a CCD camera and the like is connected to an astronomical telescope. The image 1 is acquired, for example, by imaging a predetermined celestial area with an exposure time that allows imaging a movement trajectory of a low earth orbit (LEO) debris to be detected as the line segment P having a fixed length.

In the image 1 shown in FIG. 2A, a portion Q denotes a portion with a high luminance value (for example, a fixed star). Because this portion Q may cause erroneous detection, such a portion is removed beforehand from the image 1 by using a general-purpose image processing method. As a method of removing the portion Q, for example, a method disclosed in Patent Literature 1 and the like may be used. It may be preferable to binarize the image 1 before moving to the process of extracting a straight line (Step 2).

As shown in FIG. 2B, extracting a straight line (Step 2) includes, for example, extracting by using the Hough transform technique the straight line L that includes the line segment P. In the Hough transform technique, the following processes are conceptually performed. First, one base point is set in the image 1, and a plurality of straight lines with different angles are drawn from this base point. This process is repeated while moving the base point in an X-axis direction and a Y-axis direction of the image 1 to define innumerable straight lines on the image 1. Then, a straight line on which pixels on the line segment P overlap the most is extracted as the straight line L. The straight line L, however, may be extracted by using a method that does not use the Hough transform technique.

As shown in FIG. 3A, acquiring a luminance distribution (Step 3) includes extracting along the straight line L a luminance value (intensity) on the straight line L extracted in the process of extracting a straight line (Step 2), and acquiring the luminance distribution 2. In FIG. 3A, the horizontal axis indicates pixels present on the straight line L, and the vertical axis indicates a luminance value. The luminance value is a data that can be easily acquired at the time of imaging as long as a general-purpose imaging device is used. To acquire the luminance distribution, a general-purpose method such as a bilinear method, a nearest neighbor method, a bicubic method may be used.

As shown in FIG. 3B, generating a virtual function model (Step 4) includes generating a likelihood function model (the virtual function model Lm) that contains a distribution of a foreground and a background. In the process of generating the virtual function model, the start point s and the end point t are virtually set at arbitrary positions, and a part that is within the start point s and the end point t is assumed as a foreground (a portion that includes debris) and the remaining portion is assumed as a background (a portion that does not include debris) to generate the likelihood function model (the virtual function model Lm) as represented by Expression 1. In the following explanation, for the convenience, a portion on the left side of the start point s is referred to as a left background, and a portion on the right side of the end point t is referred to as a right background.

[Equation 1]

$$Lm = (1/\sqrt{2\pi\overline{\sigma}_{bg}^2})^{s-1} \exp(-(I_1 - \mu_{bg})^2/2\overline{\sigma}_{bg}^2 \cdots -(I_{s-1} - \mu_{bg})^2/2\overline{\sigma}_{bg}^2) \times (1/\sqrt{2\pi\overline{\sigma}_{fg}^2})^{t-s} \exp(-(I_s - \overline{\mu}_{fg})^2/2\overline{\sigma}_{bg}^2 \cdots -(I_{t-1} - \overline{\mu}_{fg})^2/2\overline{\sigma}_{bg}^2) \times (1/\sqrt{2\pi\overline{\sigma}_{bg}^2})^{n-t+1} \exp(-(I_t - \mu_{bg})^2/2\overline{\sigma}_{bg}^2 \cdots -(I_n - \mu_{bg})^2/2\overline{\sigma}_{bg}^2)$$

(Expression 1)

Here, $I_i$ (where $1 \leq i \leq n$) is the luminance value of each pixel present on the straight line L; n is the number of pixels present on the straight line L; $\overline{\mu}_{fg}$ (in the expression, a macron (bar) is on $\mu$) is an average luminance value (estimated value) of the foreground; $\overline{\sigma}_{fg}$ (in the expression, a macron (bar) is on $\sigma$) is a standard deviation (estimated value) of the foreground; $\mu_{bg}$ is an average luminance value (estimated value) of the background; $\sigma_{bg}$ is a standard deviation (estimated value) of the background; s is the start point; and t is the end point.

On the right side of the likelihood function model (the virtual function model Lm) in Expression 1, elements of the first row represent the left background, elements of the second row represent the foreground, and elements of the third row represent the right background. Such a likelihood function model (the virtual function model Lm) can be easily designed by a person skilled in the art by combining a step function and Gaussian noise. To generate the likelihood function model (the virtual function model Lm), an average luminance value and a standard deviation of the foreground, and an average luminance value and a standard deviation of the background are used.

While generating the likelihood function model, the start point s and the end point t of the foreground are the virtual end points. Therefore, the average luminance value and the standard deviation of the foreground are the estimated values. Moreover, the average luminance value and the standard deviation of the background may be derived either from the luminance distribution 2 or the original image 1.

The likelihood function model represented by Expression 1 is just an example of the virtual function model Lm. The virtual function model Lm may be designed by using a ramp function, a sigmoid function, or a combination thereof with the Gaussian noise and the like.

As shown in FIG. 3C, estimating the end points (Step 5) includes estimating the more likely start point s' and end point t' by moving the start point s and the end point t on the straight line (in the left-right direction in the diagram) such that the distribution of the foreground in the likelihood function model (the virtual function model Lm) matches the luminance distribution 2. The start point s' and the end point t' are estimated by repeating the process of determining whether the luminance values near the start point s and the end point t of the line segment P contained in the virtual function model Lm probabilistically (or statistically) belong to the foreground or the background.

This process is generally called a maximum likelihood method, and by using the maximum likelihood method, more accurate end points (the start point and the end point) of the line segment P may be detected. However, while moving the start point s and the end point t on a straight line (in the left-right direction shown in FIG. 3B), a position of either of the end points may be fixed and a position of the other end point may be moved.

Specifically, while changing the start point s and the end point t of the likelihood function model and using those values, the likelihood of the luminance on the straight line L is calculated by using Expression 1. In effect, values are calculated by taking a logarithm of Expression 1. Then, values of s and t when the likelihood is the highest are estimated as the final start point s' and the final end point t'. Various methods are available to propose parameters to derive the maximum likelihood values in a two-dimensional space (s, t). In the algorithm according to the present embodiment, the start point s' and the end point t' are estimated one by one. This is so because the straight line L obtained by using the Hough transform technique includes debris and there is no need to search all of the space by simultaneously changing the start point s and the end point t, and because, in the virtual function model Lm, change in the position of one end point between the start point s and the end point t does not significantly affect the change in the position of the other end point (that is, the mutual independence between the start point s and the end point t is high).

Repeating (Step 6) includes regenerating the virtual function model (the virtual function model Lm) by using the start point s' and the end point t' obtained by estimating the end points (Step 5). In this manner, by repeatedly regenerating the likelihood function model (the virtual function model Lm) and estimating the start point and the end point, the positions of the end points (the start point and the end point) of the line segment P can be detected more accurately. The number of times the process of repeating (Step 6) is to be repeated, however, can be set as desired. Alternatively, the process can be omitted if not necessary.

Judging erroneous detection (Step 7) includes a process performed to suppress erroneous detection caused due to external disturbance. FIG. 4A illustrates an example of the luminance distribution that indicates only the background that does not include debris on the straight line L. FIG. 4B illustrates an example of the luminance distribution that includes two fixed stars on the straight line L. The erroneous detection may be judged based on a magnitude of an S/N ratio (Signal to Noise ratio), and variation in the luminance may be judged based on an χ square ($\chi^2$) value.

For example, as shown in FIG. 4A, when a part of the background (that is, a portion estimated as the foreground) is erroneously detected as a portion that includes debris, the S/N ratio (that is, separation of the luminance values between the background and the foreground) decreases. Therefore, by setting an appropriate threshold value for the S/N ratio, it can be judged that the detection is erroneous when the S/N ratio is smaller than the threshold value, and it can be judged that the debris is detected when the S/N ratio is larger than the threshold value.

For example, as shown in FIG. 4B, when a portion that includes the two fixed stars is erroneously detected as a portion that includes the debris, the variation in the luminance values in the estimated foreground increases. In such a case, by setting an appropriate threshold value for the χ square value, it can be judged that the detection is erroneous when the χ square value is larger than the threshold value, and it can be judged that the debris is detected when the χ square value is smaller than the threshold value.

With the line segment detection method according to the present embodiment, the end points (the start point and the end point) of the line segment P can be efficiently and accurately detected from the captured image 1. Therefore, by using the line segment detection method according to the present embodiment, the accurate position and speed of debris can be easily determined from the image 1, and the accurate orbit of the debris can be obtained in a short time.

A case in which the debris is detected from the image 1 has been explained above. However, the present disclosure is not limited to that case. As long as a line segment is to be detected from an image that includes a line segment from which a luminance distribution can be acquired, the line segment detection method explained above can be easily applied to other fields (for example, extracting a white line of a road and the like).

The present disclosure is not limited to the above embodiments, and can be modified in various manners without departing from the gist of the present disclosure.

What is claimed is:

1. A line segment detection method for detecting a line segment from an image, the line segment detection method comprising:
    extracting a straight line including the line segment from the image;
    acquiring a luminance distribution on the straight line;
    generating a virtual function model that contains a distribution of a foreground and a background of the image based on the luminance distribution, wherein the foreground is part of the straight line assumed as the line segment within a start point and an end point virtually set at arbitrary positions on the straight line, and the background is part of the straight line except for the foreground on the straight line;
    estimating values of the end points of the line segment in the virtual function model by determining whether luminance values near the start point and the end point on the straight line probabilistically belong to the foreground or the background,
    repeatedly regenerating the virtual function model by using the estimated values of the end points obtained at the estimating the end points,
    wherein the virtual function model is any one of a likelihood function model, a ramp function model, and a sigmoid function model.

2. The line segment detection method according to claim 1 further comprising judging whether a detection is erroneous or not by using the estimated values of the end points obtained at the estimating the end points.

3. The line segment detection method according to claim 1, wherein the estimating the end points includes estimating the end points by using a maximum likelihood method.

4. The line segment detection method according to claim 1, wherein the image contains debris that moves in the Earth's orbit, and the line segment is a movement trajectory of the debris.

* * * * *